United States Patent
Zhang

(10) Patent No.: US 8,945,655 B2
(45) Date of Patent: Feb. 3, 2015

(54) STABLE AND CONSUMABLE COMPOSITIONS

(75) Inventor: Shi-Qiu Zhang, Tenafly, NJ (US)

(73) Assignee: Conopco, Inc., Englewood Cliffs, NJ (US)

(*) Notice: Subject to any disclaimer, the term of this patent is extended or adjusted under 35 U.S.C. 154(b) by 1567 days.

(21) Appl. No.: 11/775,526

(22) Filed: Jul. 10, 2007

(65) Prior Publication Data

US 2009/0017183 A1 Jan. 15, 2009

(51) Int. Cl.
- A23F 3/00 (2006.01)
- A23L 2/52 (2006.01)
- A23F 3/14 (2006.01)
- A23L 1/30 (2006.01)
- A23F 3/30 (2006.01)

(52) U.S. Cl.
CPC ... A23F 3/14 (2013.01); A23L 2/52 (2013.01); A23L 1/3002 (2013.01); A23F 3/30 (2013.01)
USPC .............................. 426/597; 426/590; 426/326

(58) Field of Classification Search
USPC .................... 426/597, 569, 590, 435, 330, 51
See application file for complete search history.

(56) References Cited

U.S. PATENT DOCUMENTS

| | | | |
|---|---|---|---|
| 2,891,866 A * | 6/1959 | Schroeder | 426/422 |
| 4,534,983 A | 8/1985 | Koene | |
| 5,501,866 A | 3/1996 | Kakuda | |
| 5,780,086 A | 7/1998 | Kirksey | |
| 5,852,058 A | 12/1998 | Cooke | |
| 5,879,733 A | 3/1999 | Ekanayake | |
| 6,036,991 A * | 3/2000 | Humphrey et al. | 426/597 |
| 6,268,009 B1 | 7/2001 | Ekanayake | |
| 6,413,570 B1 | 7/2002 | Lehmberg et al. | |
| 6,462,051 B1 | 10/2002 | Nozawa | |
| 6,482,450 B1 | 11/2002 | Goodsall | |
| 6,491,961 B1 | 12/2002 | Balentine | |
| 6,652,890 B2 | 11/2003 | Morré et al. | |
| 6,831,103 B1 | 12/2004 | Ueda et al. | |
| 7,014,876 B2 | 3/2006 | Iwasaki | |
| 7,190,236 B2 | 3/2007 | Lee et al. | |
| 7,357,956 B2 | 4/2008 | Zhang et al. | |
| 7,419,693 B2 | 9/2008 | Kester et al. | |
| 2001/0001307 A1 | 5/2001 | Ueda | |
| 2002/0001651 A1 | 1/2002 | Norris et al. | |
| 2002/0188025 A1 | 12/2002 | Ozeki | |
| 2003/0003130 A1 | 1/2003 | Okubo | |
| 2003/0054089 A1 | 3/2003 | Prosise et al. | |
| 2003/0096050 A1 | 5/2003 | Inaoka et al. | |
| 2003/0203072 A1 | 10/2003 | O'Mahony | |
| 2004/0009283 A1 | 1/2004 | Holmes et al. | |
| 2004/0171624 A1 | 9/2004 | Ozeki | |
| 2005/0003068 A1 | 1/2005 | Kester et al. | |
| 2005/0008753 A1 | 1/2005 | Honda | |
| 2005/0020627 A1 | 1/2005 | Ozeki | |
| 2005/0090512 A1 | 4/2005 | Geiss | |
| 2005/0123660 A1 | 6/2005 | Zhang et al. | |
| 2005/0287278 A1 | 12/2005 | Quan | |
| 2006/0004026 A1 | 1/2006 | Kumagai | |
| 2006/0093725 A1 | 5/2006 | Zhang | |
| 2006/0134300 A1 | 6/2006 | Newman | |
| 2006/0134301 A1 | 6/2006 | Zhang | |
| 2006/0159829 A1 | 7/2006 | Owen | |
| 2006/0177759 A1 | 8/2006 | Tsujino et al. | |
| 2006/0217321 A1 | 9/2006 | Ozeki | |
| 2007/0048429 A1 | 3/2007 | Griffiths et al. | |
| 2007/0172510 A1 | 7/2007 | Melton | |
| 2007/0172530 A1 | 7/2007 | Unno et al. | |
| 2007/0231444 A1 | 10/2007 | Matsumoto | |
| 2007/0248737 A1 | 10/2007 | Kulkarni | |
| 2008/0020069 A1 | 1/2008 | Colliver et al. | |
| 2008/0044539 A1 | 2/2008 | Perlman | |
| 2008/0057172 A1 | 3/2008 | Jones | |
| 2008/0075765 A1 | 3/2008 | Bukowski | |
| 2008/0085356 A1 | 4/2008 | Colliver | |
| 2008/0095913 A1 | 4/2008 | Jones | |
| 2008/0113044 A1 | 5/2008 | Alberte | |
| 2008/0193626 A1 | 8/2008 | Jones | |
| 2009/0011102 A1 * | 1/2009 | Gosselin et al. | 426/541 |
| 2010/0015288 A1 | 1/2010 | Fukuda et al. | |

FOREIGN PATENT DOCUMENTS

| | | |
|---|---|---|
| CA | 2459240 | 8/2005 |
| CN | 1286082 | 3/2001 |
| CN | 1444872 | 10/2003 |
| DE | 10158498 | 7/2003 |
| DE | 20311240 | 9/2003 |
| DE | 20 2005 020103 U1 | 4/2006 |
| DE | 20200502013 | 6/2006 |
| EH | WO2005122799 | 12/2005 |
| EH | WO2008142392 | 11/2008 |
| EP | 1 297 749 A | 4/2003 |
| EP | 1393726 | 3/2004 |

(Continued)

OTHER PUBLICATIONS

Han; Antioxidant and Apoptosis-inducing Activities of Ellagic Acid; Anticancer Research Sep. 1, 2006 vol. 26 No. 5A 3601-3606.*

Lin; Survey of Catechins, Gallic Acid, and Methylxanthines in Green, Oolong, Pu-erh, and Black Teas; J. Agric. Food Chem. 1998, 46, 3635-3642.*

Tea Health: The healthy difference is out tea; Wayback publish date Jan. 10, 2004; http://web.archive.org/web/20040110165327/http://greentea lovers.com/greenteahealthcatechin.htm.*

The Manly Teas: Pink Lady Apple Green Tea; Wednesday, Nov. 22, 2006; http://www.manlyteas.com/2006/11/manly-teas-part-6.html.*

(Continued)

Primary Examiner — Patricia George

(74) Attorney, Agent, or Firm — Ellen Plotkin

(57) ABSTRACT

Stable and consumable compositions are described. The stable and consumable compositions can be green tea beverages that have added acidic stabilizer, like gallic acid, to stabilize elevated levels of antioxidants such as catechins formulated in the beverage.

4 Claims, No Drawings

(56) References Cited

FOREIGN PATENT DOCUMENTS

| | | |
|---|---|---|
| EP | 1527694 | 5/2005 |
| EP | 1 552 756 A | 7/2005 |
| EP | 1743633 | 1/2007 |
| EP | 1810575 | 7/2007 |
| FR | 2789268 | 8/2000 |
| GB | 1310658 | 3/1973 |
| GB | 2095968 | 10/1982 |
| GB | 2348104 | 9/2007 |
| JP | 37-004937 | 6/1962 |
| JP | B374937 | 6/1962 |
| JP | 01102002 | 4/1989 |
| JP | 01102022 | 4/1989 |
| JP | 03266938 | 11/1991 |
| JP | 08073350 | 3/1996 |
| JP | 8109104 | 4/1996 |
| JP | 08198748 | 8/1996 |
| JP | 09040568 | 2/1997 |
| JP | 2001187736 | 7/2001 |
| JP | 2001520865 | 11/2001 |
| JP | 2002322063 | 8/2002 |
| JP | 2002322053 | 11/2002 |
| JP | 2002370979 | 12/2002 |
| JP | 2003033157 | 2/2003 |
| JP | 2003164259 | 6/2003 |
| JP | 2003261456 | 9/2003 |
| JP | 2004105003 | 4/2004 |
| JP | 2004129670 | 4/2004 |
| JP | 2004168686 | 6/2004 |
| JP | 2004222640 | 8/2004 |
| JP | 2005204527 | 8/2005 |
| JP | 2005278519 | 10/2005 |
| JP | 2006166771 | 6/2006 |
| JP | 2007089576 | 4/2007 |
| JP | 2007521010 | 8/2007 |
| JP | JP2007195458 | 8/2007 |
| JP | 2008514212 | 5/2008 |
| KR | 2006066160 | 6/2006 |
| KR | 1020070074718 | 7/2007 |
| WO | WO9500038 | 1/1995 |
| WO | WO9518540 | 7/1995 |
| WO | WO9604801 | 2/1996 |
| WO | WO9921431 | 5/1999 |
| WO | WO0170038 | 9/2001 |
| WO | 01/87095 | 11/2001 |
| WO | WO2005006871 | 1/2005 |
| WO | WO2005067727 | 7/2005 |
| WO | WO2005097101 | 10/2005 |
| WO | WO2006021317 | 3/2006 |
| WO | WO2006027063 | 3/2006 |
| WO | WO2006037503 | 4/2006 |
| WO | WO2006037504 | 4/2006 |
| WO | WO2006037511 | 4/2006 |
| WO | WO2006118090 | 11/2006 |
| WO | WO2007098931 | 9/2007 |
| WO | WO2008012952 | 1/2008 |
| WO | WO2008072359 | 6/2008 |
| WO | WO2008081582 | 7/2008 |
| WO | WO2008084762 | 7/2008 |

OTHER PUBLICATIONS

MDidea: Apple and Apple Phytochemicals,how strange a common fruit so magic use?; Apple Constituents; printed Jul. 14, 2011.*

Sanderson: Contribution of Polyphenolic Compounds to the Taste of Tea; Phenolic, Sulfur, and Nitrogen Compounds in Food Flavors; Chapter 2, pp. 14-46; Chapter DOI: 10.1021/bk-1976-0026.ch002; ACS Symposium Series, vol. 26; ISBN13: 9780841203303eISBN: 9780841202672; Publication Date (Print): Jun. 1, 1976.*

Sharma: Triphala: A Comman Ayurvedic Medicine; • Written by: Tripti Sharma; Dec. 9, 2005; Categorized in: Herbs; http://integrativehealthcareinstitute.org/journal/articles/triphala-a-comman-ayurvedic-medicine-2.html.*

Co-pending application for: Gosselin et al.; U.S. Appl. No. 11/635,793, filed Dec. 8, 2006.

Co-pending application for: Zhang; U.S. Appl. No. 11/839,968, filed Aug. 16, 2007.

Co-pending application for: Zhang et al.; U.S. Appl. No. 12/001,721, filed Dec. 12, 2007.

International Search Report on and Written Opinion International Application No. PCT/EP2008/058822 dated Nov. 11, 2008.

Database WPI Week 200347, XP002501507 & JP 2003 038144 (astract).

The Manly Teas, The Manly Teas Pink Lady Apple Green Tea Supporting Cancer Research, Nov. 22, 2006, US.

Alberts et al., General Principles of Cell Signaling, Essential Cell Biology 2nd Ed 1998 pp. 489-490, 1998, 489-490.

Berlitz, Coffee Tea Cocoa, Food Chemistry 1999 pp. 888-889, 1999.

Chen, Capillary Electrophoretic Determination of Theanine, Caffeine and Catechins in Fresh Tea Leavesand Oolang Tea and Their Effects on Rat neurosphere Adhesion and Migration, Journal of Agricultural and Food Chemistry, Oct. 31, 2003, 7495-7503, 51, TW.

Cloughley et al., The Effect of pH Modification During Fermentation on the Quality Parameters of Central African Black Teas, J of Sci Food Agric 1980 vol. 31 pp. 924-934, 1980, 924-934, 31.

Cloughley, The Effect of pH Modification During Fermentation on the Quality Parameters of Central African Black Teas, J Sci Food Agric 1980 31 pp. 924-934, 1980, 924-934, 31.

Ekborg-Ott, Varietal Differences in the Total and Enantiomeric Composition of Theanine in Tea, Journal of Agricultural and Food Chemistry, 1997, 353-363, 45, US.

Evans et al., Review Phenolics inflammation & nutrigenomics, J Sci Food Agric 2006 86 pp. 2503-2509, 2006, 2503-2509, 86, Society of Chemical Industry, US.

Huang et al., Inhibitory effects of black tea theaflavin derivatives on 12-O-tetradecanoylphorbol-13-acetate-induced inflammation and arachidonic acid metabolism in mouse ears, Mol Nutrition Food Res 2006 vol. 50 pp. 115-122, 2006, 115-122, 86.

Khokhar, Total Phenol, Catechin and Caffeine Contents of Teas Commonly Consumed in the United Kingdom, Journal of Agricultural and Food Chemistry, Jan. 4, 2002, 565-570, 50, GB.

Lin et al., Survey of Catechins, Gallic Acid, and Methylxanthines in Green, Oolong, Pu-erh, and Black Teas, J. Agric. Food Chem., 1998, pp. 3635-3642, 46.

Matsuura et al., Effects of Precursor, Temperature and Illumination on Theanine Accumulation in Tea Callus, Agric Biol Chem 1990 54 9 pp. 2283-2286, Mar. 5, 1990, 2283-2286XP009075897, 54 (9).

* cited by examiner

STABLE AND CONSUMABLE COMPOSITIONS

FIELD OF THE INVENTION

The present invention is directed to a consumable composition as well as a consumable composition precursor and method for making the consumable composition. More particularly, the invention is directed to a consumable composition comprising plant extract solid and an added acidic stabilizer comprising an acid found in a plant extract solid. The consumable composition of this invention unexpectedly has excellent taste characteristics and at the same time better stability characteristics when compared to similar consumable compositions with no added acidic stabilizer and about the same amount by weight catechin.

BACKGROUND OF THE INVENTION

Excluding water, tea is the most popular beverage consumed by man. Tea is very refreshing, can be served either hot or cold, and has been made commercially available for many years. Lipton®, for example, is the world's leading brand of tea, made available in over 110 countries by Unilever.

Today, modern scientists are exploring the exciting potential of tea, which has a unique combination of natural antioxidants known as flavonoids that can include catechins, flavonois and flavonol glucosides. Taken regularly, tea can help improve vascular function, combat fatigue, reduce cholesterol levels and increase feelings of vitality.

Antioxidants found in tea, especially green tea, are believed to reduce the risk of cancer. Studies indicate that antioxidants lower the risks of cancer in the upper digestive trad, colon, rectum, pancreas and breast. Moreover, catechins including epigallocatechin gallate, (EGCG), epicatechin (EC), epicatechin gallate (ECG), and epigallocatechin (EGC), which are found in tea, have been shown to positively impact physiological activities, and their use as antiallergic agents and cerebral function activators has been proposed.

In view of the many positive contributions associated with antioxidants, it is desirable to formulate consumable compositions, like beverages with tea solids, with elevated levels of antioxidants, especially catechins. Unfortunately, however, increased amounts of catechins, like epigallocatechin gallate, in food compositions can lead to end use products (especially beverages with tea solids) that can have poor stability, appearance and taste characteristics.

It is of increasing interest to produce stable consumable compositions with elevated levels of catechins. This invention, therefore, is directed to a stable and consumable composition as well as a precursor and method suitable for use to make the same. The stable and consumable composition of this invention comprises plant extract solid and an added acidic stabilizer comprising an acid found in a plant extract solid. The composition of this invention, unexpectedly, has excellent stability, appearance and taste characteristics even when the same is formulated with elevated levels of catechins. Moreover, the composition of this invention can be stabilized with an acidic stabilizer (like gallic acid) that has antioxidant properties.

Additional Information

Efforts have been made for making tasty consumable compositions. In U.S. Application Publication No. 2003/0054089 A1, ready-to-eat and tasty foods are described.

Other efforts have been disclosed for making good tasting edible consumables. In U.S. Application Publication No. 2002/0001651 A1, edible consumables with monomeric or oligomeric polyphenolic compounds are described.

Even other efforts have been made for making good tasting consumable compositions. In U.S. Application Publication No. 2005/0123660 A1, beverage compositions with improved flavor are described.

Yet other efforts have been disclosed for making good tasting consumable compositions. In U.S. Pat. No. 6,413,570, concentrates for good tasting ready-to-drink tea compositions are described.

Still other efforts that address tea compositions have been disclosed. In U.S. Application Nos. 2005/0003068 A1 and 2006/0177559 A1, and U.S. Pat. Nos. 6,652,890 B2 and 7,109,236 B2, tea compositions with catechins are described.

None of the additional information above describes a stable consumable composition comprising plant extract solid and an added acidic stabilizer comprising an acid found in a plant extract solid.

SUMMARY OF THE INVENTION

In a first aspect, the present invention is directed to a precursor for making a consumable composition, the precursor comprising:
a) plant extract solid; and
b) added acidic stabilizer comprising an acid found in a plant extract solid.

In a second aspect, the present invention is directed to a consumable composition comprising:
a) plant extract solid; and
b) added acidic stabilizer comprising an acid found in a plant extract solid.

In a third aspect, the present invention is directed to a method for making the consumable composition of the second aspect of this invention.

All other aspects of the present invention will more readily become apparent upon considering the detailed description and Examples which follow.

Consumable composition, as used herein, is meant to include a food product that is ready-to-consume, like a beverage (e.g., energy drink, fruit juice, coffee or tea), spread, sauce, dip, spoonable dressing, pourable dressing, ice cream, pasta composition, wheat-based composition, meal supplement or replacement drink, or meal supplement or replacement bar. In a preferred embodiment, the consumable composition of this invention is a ready-to-drink tea beverage, and especially, a ready-to-drink green tea beverage (with or without carbonation).

Consumable composition precursor means a precursor composition used to make a consumable composition. The preferred consumable composition precursor of this invention is a powder that can be diluted with water to make a beverage with tea solids, and especially, a green tea beverage. It is also within the scope of this invention for the consumable composition precursor to be tea leaf suitable for infusion with water.

Elevated levels of catechin are meant to mean at least about 0.0125%, and preferably, at least about 0.035%, and most preferably, from about 0.05 to about 0.09% by weight catechin based on total weight of the consumable composition.

Stable is meant to mean that less than about 20%, and preferably, less than about 18%, and most preferably, less than about 15% by weight of all catechin within the consumable composition degrades within a two month period after formulating and when stored at about 95° C. temperature. Stable is also meant to include, when the consumable composition is a beverage (especially a beverage with tea solids), having a turbidity of less than about 75 Nephelometric Turbidity Units (NTU) when more than about 0.5 to about 2% by weight plant extract solids are present in the consumable composition, and less than about 33 NTU when at least about 0.05 to about 0.5% by weight plant extract solids are present in the consumable composition which has been stored at the above-identified conditions (determined with a Hatch Turbidimeter). Acid is not meant to include 100% citric acid and is not meant to include 100% Vitamin C.

Excellent taste characteristics means formulated with more than about 0.0125% to about 0.035% by weight catechin and having taste characteristics substantially the same as conventionally formulated and similar compositions that have less than about 0.0125% by weight catechin and are free of added acidic stabilizer.

Catechin as used herein is meant to mean total catechins present.

Unless explicitly stated to the contrary, all ranges described herein are meant to include all ranges subsumed therein. Moreover, the term comprises is meant to encompass the terms consisting essentially of and consisting of.

DETAILED DESCRIPTION OF THE PREFERRED EMBODIMENTS

The only limitations with respect to the type of acidic stabilizer that may be used in this invention is that the same comprises an acid found in a plant extract solid which may be used in a consumable composition and the acid is not 100% citric acid and not 100% Vitamin C. Often, such an acid has the formula:

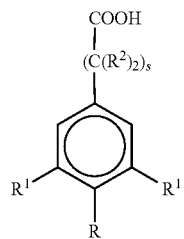

where R is independently H, OH or a $C_{1-4}$ alkoxy group, each $R^1$ is independently H, OH or a $C_{1-6}$ alkoxy group; and each $R^2$ is independently H, OH, $C_{1-4}$ alkyl, or a $C_{1-6}$ alkoxy group, further where s is an integer from 0 to about 4.

In an often preferred embodiment the acidic stabilizer comprises p-hydroxybenzoic, vanillic, gallic, syringic, catechuic, protocatechuic, cinnamic, p-coumaric, caffeic, quinic, ferulic acid, or a mixture thereof.

In another preferred embodiment, the acidic stabilizer may comprise acids found in a plant extract solid not represented by the formula and these acids include ellagic or chlorogenic acid or mixtures thereof and including mixtures with acids represented by the formula.

In a most preferred embodiment, the acidic stabilizer used is one with gallic acid.

When adding acidic stabilizer comprising acid found in a plant extract solid, to make either the precursor or consumable composition, the weight ratio of acid naturally present within the plant extract solid used to prepare the precursor or consumable composition, as the case may be, to the amount of acid added via the acidic stabilizer is such that $$\left( \frac{\text{weight of acid naturally present}}{\text{weight of added acid}} \right) = \text{about } 0.004 \text{ to about } 0.25$$

and preferably, from about 0.01 to about 0.16, and most preferably, from about 0.02 to about 0.08, including all ranges subsumed therein.

The source of the acidic stabilizer comprising acid found in plant extract solid is, for example, a product extracted from nutgall, apple trees, grapevines, gooseberry or strawberry plants or a tea plant, like *Canellia sinensis* and/or *Canellia assamica*. In an often preferred embodiment, the amount of acid present is enough to yield final consumable composition (especially a beverage with tea solids) with at least about 0.015%, and preferably, at least about 0.05%, and most preferably, from about 0.09 to about 0.55% by weight total acid (added acid plus acid naturally present), in the consumable composition, including all ranges subsumed therein. In an especially preferred embodiment, the pH of the consumable composition of this invention is from about 2.5 to about 6.0, including all ranges subsumed therein.

Typically, the amount of acid added is at least about 0.013, and preferably, at least about 0.035, and most preferably, at least about 0.05 to about 0.47% by weight, based on total weight of the consumable composition and including all ranges subsumed therein. While the acidic stabilizer may also comprise optional ingredients like preservative, flavor, filler and/or sweetener, the acidic stabilizer can consist essentially of or consist of the acid found in a plant extract.

It is in the scope of this invention for the consumable composition to comprise of at least about 0.02% by weight plant extract solids, preferably, the same may comprise from about 0.05 to about 2% by weight plant extract solids, and most preferably, from about 0.08 to about 0.7% by weight plant extract solids, based on total weight of the consumable composition and including all ranges subsumed therein.

It is also within the scope of this invention for the consumable composition precursor to be in the form of a powder (e.g., about 100% solids) to make, for example, ready-to-drink tea beverages like ready-to-drink green tea beverages (and ready-to-drink black tea and green tea mixed beverages) with elevated levels of catechin. The consumable composition precursor may also be tea leaf in a tea bag or for use with filter paper.

When making consumable composition precursor in the form of a powder, a dry mix with, for example, plant extract solids, flavors, sweeteners, catechin and acidic stabilizer comprising an acid found in plant extract solid is mixed or blended.

The leaf suitable for use in this invention may be prepared by combining tea leaf with catechin if higher levels are desired and the acidic stabilizer comprising an acid found in plant extract solid as described herein.

The acidic stabilizer, therefore, can be combined with leaf and packaged in a conventional tea bag for hot or cold water infusion. Conventional powders and conventional leaf products used to make tea beverages are commercially available from suppliers like Unilever under the Lipton® Tea Brand. It is, therefore, within the scope of this invention to add the acid stabilizer as described herein to such powders and leaf products that are commercially available whereby it is further within the scope of this invention to also add catechin to the precursors so that consumable beverage compositions with elevated levels of catechin may be prepared.

In a preferred embodiment, the powder may be diluted with water to produce, for example, a consumable tea composition with good taste and appearance characteristics. Such a consumable tea composition is translucent, healthy and free of precipitate like white alcoholic precipitate.

It is within the scope of this invention to employ optional additives like a chelator (e.g., EDTA), sequestering agent (e.g., sodium hexametaphosphate), colorant, filler (like a dextrin-based compound), preservative, flavor, vitamin, sweetener, fruit juices, surfactant (like sorbitan monolaurate and sorbitan monopalmitate), acidulant, antifoam or the like. When employed, such optional additives, collectively, make up less than about 15.0% by weight of the total weight of the consumable composition precursor.

In an especially preferred embodiment, the resulting consumable composition made according to this invention will have no more than about 0.003% by weight chelator (like EDTA), preferably less than about 0.002% by weight chelator, and most preferably, from about 0 to about 0.001% by weight chelator, including all ranges subsumed therein.

When making the consumable composition of this invention in beverage form, precursor is combined with water (or other desired diluent) to produce the desired product.

The packaging for the consumable compositions made according to this invention is limited only to the extent that it is acceptable to the everyday consumer. Such packaging can include bottles (glass or PET), cans or standard drink pouches or boxes.

The examples which follow are provided to facilitate an understanding of the present invention. The examples are not intended to limit the scope of the claims.

Example 1

Consumable composition precursors (in the form of powders) were prepared by mixing dry ingredients. Water was added to the powders to produce control tea beverages and tea beverages made according to the present invention.

| Ingredient | Wt. % in Tea Beverage |
|---|---|
| Stable Consumable Composition | |
| Artificial sweetener | 0.05-0.07 |
| Preservative | 0.02-0.4 |
| Sequestering agent | 0.070-0.09 |
| Chelator | 0.002-0.003 |
| Added acid | 0.07-0.12 |
| Flavor | 0.03-0.04 |
| Acidulant | 0.0-0.06 |
| Vitamin | 0.045-0.052 |
| Tea powder* | 0.25-0.35 |
| Water | Balance |
| Control Consumable Composition | |
| Artificial sweetener | 0.05-0.07 |
| Preservative | 0.02-0.4 |
| Sequestering agent | 0.070-0.09 |
| Chelator | 0.002-0.003 |
| Citric acid | 0.07-0.12 |
| Flavor | 0.03-0.04 |
| Acidulant | 0.0-0.06 |
| Vitamin | 0.045-0.052 |
| Tea powder* | 0.25-0.35 |
| Water | Balance |

*Tea powder with about 10 to about 35% by weight catechin.

Example 2

Panelists visually observed and tasted the beverages prepared in Example 1 after such beverages were in storage for about 3.5 months. All panelists concluded that the tea beverage made according to this invention was better tasting and appeared clearer than the control beverage made with citric acid. Furthermore, the control had significant amounts of precipitate and no precipitate could be found in the product made according to this invention.

Example 3

The beverages of Example 1, after having been stored at about 95° C. for about two (2) months, were analyzed for clarity with a commercially available Hatch Turbidimeter. The results confirmed the visual assessment of the panelists such that the tea beverage made according to this invention had a turbidity of about 30 NTU and the turbidity of the control beverage was not measurable because of the significant amount of precipitate present.

Example 4

The tea beverage made according to this invention and the control beverage, after being stored at about 95° C. for about two (2) months, were assessed for catechin stability via HPLC analysis. The results indicated that about twice as much catechin was lost in the control tea beverage, surprisingly demonstrating that consumable compositions made with the acidic stabilizer of this invention had stabilized catechins even at elevated levels.

What is claimed is:

1. A consumable ready-to-drink green tea beverage composition comprising:
    a) 0.05-2% tea solids; and
    b) added gallic acid stabilizer;
    wherein the consumable composition comprises from about 0.0125% to about 0.035% catechin, and has a turbidity of less than about 75 Nephelometric Turbidity Units; and
    wherein a weight ratio of naturally present acid to acid added with said added gallic acid stabilizer satisfies the equation:

(weight of acid naturally present in the tea solids)/
    (weight of added gallic acid stabilizer)=about
    0.004 to about 0.25 and wherein said consumable ready-to-drink green tea beverage composition is stable and comprises less than 0.003% by weight chelator.

2. The consumable ready-to-drink green tea beverage composition according to claim 1, wherein the consumable composition comprises at least 0.0155 by weight total acid.

3. A precursor for making the consumable ready-to-drink green tea beverage composition of claim 1.

4. A method for making consumable ready-to-drink green tea beverage composition comprising the step of addition diluant to the precursor of claim 3.

* * * * *